United States Patent [19]

Narumiya

[11] Patent Number: 4,931,860

[45] Date of Patent: Jun. 5, 1990

[54] IMAGE DATA COMPOSING SYSTEM AND PROCESS FOR STORING BOTH MONOCHROME AND POLYCHROME IMAGE DATA

[75] Inventor: Masao Narumiya, Nara, Japan

[73] Assignee: Sharp Kabushiki Kaisha, Osaka, Japan

[21] Appl. No.: 219,775

[22] Filed: Jul. 18, 1988

[30] Foreign Application Priority Data

Jul. 20, 1987 [JP] Japan .................................. 62-181824

[51] Int. Cl.⁵ .............................................. H04N 1/46
[52] U.S. Cl. .......................................... 358/75; 358/79
[58] Field of Search ......................... 358/75, 78, 79, 80

[56] References Cited

U.S. PATENT DOCUMENTS

| | | | |
|---|---|---|---|
| 4,516,139 | 3/1985 | Takiguchi | 358/298 X |
| 4,589,035 | 5/1986 | Yamanishi et al. | 358/78 |
| 4,673,972 | 6/1987 | Yokomizo | 358/75 X |
| 4,682,216 | 7/1987 | Sasaki et al. | 358/79 |
| 4,713,684 | 12/1987 | Kawamura et al. | 358/78 |
| 4,739,397 | 4/1988 | Hayashi | 358/75 X |
| 4,772,911 | 9/1988 | Sasaki et al. | 358/75 X |

Primary Examiner—James J. Groody
Assistant Examiner—Mark R. Powell
Attorney, Agent, or Firm—Birch, Stewart, Kolasch & Birch

[57] ABSTRACT

An image data composing system and process is described which includes initially separating image data obtained from an original into a plurality of items of primary image data when the original bears a polychrome image. The items of image data, as separted for primary colors, are then stored in a plurality of memories. Next, the image data obtained from the original is converted to monochrome image data comprising first and second level value data when the original bears a monochrome image. This monochrome image data is then entered into at least one specified memory, included in the previously mentioned memories, and first level value is written in addresses corresponding to first level value data. Then, the binary image data is entered into the remaining memories and the second level value is written in addresses corresponding to the first level value data. Finally, the image data is delivered from the memory device to an image forming apparatus from item to item.

28 Claims, 4 Drawing Sheets

IMAGE DATA COMPOSING SYSTEM AND PROCESS FOR STORING BOTH MONOCHROME AND POLYCHROME IMAGE DATA

BACKGROUND OF THE INVENTION

1. Field of the Invention

The present invention relates to a system and process for composing an image data for use in image forming apparatus. For example, the present invention is used for forming a color print composed from a polychrome original and monochrome original.

2. Description of the Prior Art

In a color copying apparatus or the like, the image of a polychrome original (color original) is conventionally separated into the three primary colors of red, green an blue. A set of primary color items of image data corresponding to each pixel are then stored in memories for the different primary colors. It is difficult, however, to store monochrome image (binary image) data, such as character image data, in such memories along with polychrome image data because in the difference of storage modes thereof. Accordingly, there is a need to provide, independent of the memories for storing the primary color items, a memory for independently storing the monochrome image data in order to superimpose the monochrome image on a polychrome image printed out (see, for example, U.S. Pat. No. 4,516,139).

SUMMARY OF THE INVENTION

The present invention provides an image data composing system which includes: a device which reads image data from an original and a memory device for storing the read image data therein. The system further includes a device for separating the image data obtained by the reading device into a plurality of items of primary image data when the original bears a polychrome image. An input device is then unitized for entering the items of image data, separated into primary colors into the memory device for storage. A conversion device may then be applied for converting the image data obtained by the reading monochrome image data comprising first and second level value data, when the original bears a monochrome image. A device is then used for specifying at least one of the memory device and an input device is then used for entering the monochrome image data into the specified memory device to write the first level value in addesses corresponding to the first level value. Further, an input device is used for entering the monochrome image data into the remaining memory device to write the second level value in addresses corresponding to the first level value data. Finally, an output device is used for delivering the image data from the memory device to a image forming device from item to item.

The invention further provides an image data composing process which includes similarly separating color image data obtained from an original into a plurality of items of primary image data when the original bears a polychrome image and storing the items of image data as separated for primary colors in a plurality of memory devices. The image data obtained from the original to monochrome image data comprising first and second level value data when the original bears a monochrome image. Then, the monochrome image data is entered into at least one specified memory device, included in the memory devices previously mentioned, in which first level value in addresses corresponding to the first level value data. Next the binary image data is entered into the remaining memory devices and a second level value is written in addresses corresponding to the first level value data. Finally, the image data is delivered from the memory device to an image forming device from item to item.

DESCRIPTION OF THE PREFERRED EMBODIMENTS

Figure 1:
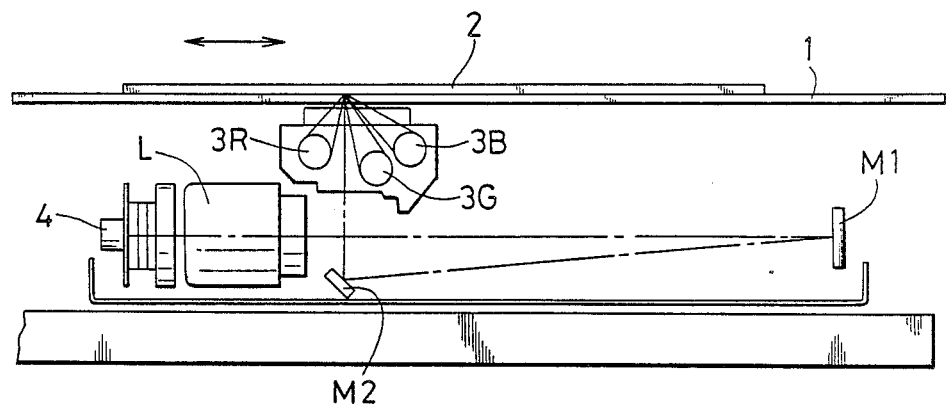
FIG. 1 is a fragmentary diagram showing the construction of a color copying apparatus embodying the invention.
Figure 2:
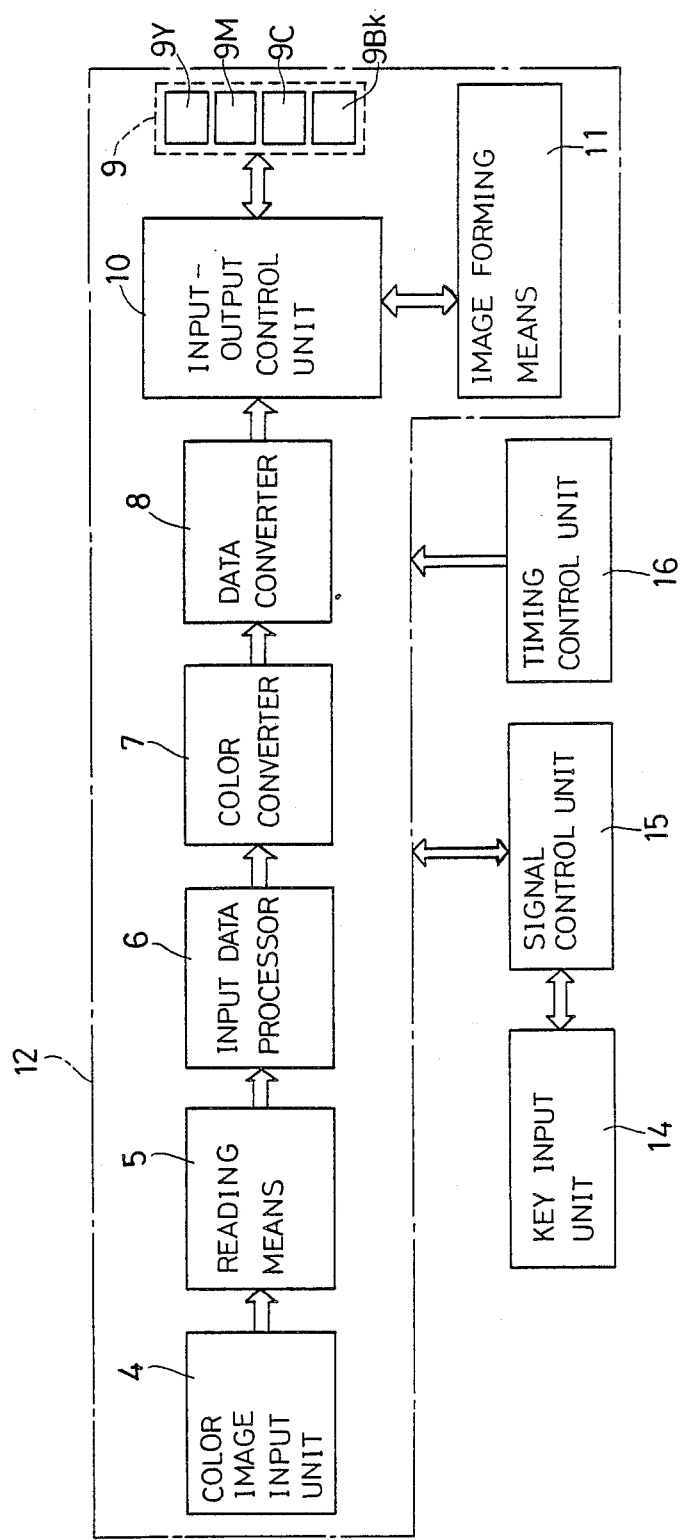
FIG. 2 is a block diagram showing the control circuit of the color copying apparatus shown in FIG. 1.

FIG. 1 is a diagram showing the basic contruction of a color copying apparatus having a movable document table and embodying the invention. FIG. 2 is a block diagram showing the control circuit of the apparatus. The construction of the color copying apparatus will be described with reference to these diagrams. The apparatus includes a transparent table 1, movable in the directions of the arrows shown, for placing the color image original 2 to be copied fluorescent lamp light sources 3R, 3G and 3B are included for producing lights in red, green and blue, respectively, which are the additive primaries. These light sources are turned on alternately to illuminate the original 2 with the lights of different colors. The light reflected from the original 2 is projected, by an optical system comprising mirrors M1, M2, lens L, etc., in combination, onto an array containing several CCDs (charge-coupled photoelectric transducers) arranged in a row and included in a color image input unit 4. The image of the original 2 is then read from line to line by reading device 5. Red, green and blue color signals DR, DG and DB are obtained by the reading device 5 and fed to an input data processor 6 after amplification.

In the input data processor 6, the color signals DR, DG and DB from the color image input unit 4 are corrected based on a shading correction value, dark component correction value, etc. obtained, for example, by white balance adjustment made for the color signals prior to the reading of the original 2, and are subjected to analog/digital conversion to obtain digital signals per picture element, i.e. per element of the CCD array of the input unit 4. The digital signal data obtained is sent to a color converter 7.

While the input data processor 6 processes the separated color signals DR, DG, DB of primaries, i.e. red, green and blue, these color signals are converted by the color converter 7 to four color signals DY, DM, DC and DBk of subtractive primaries, i.e. yellow, magenta and cyan, and in addition, black, which are then sent to a data converter 8. The converter 8 comprises, for example, a dither matrix, by which the data per picture element is subjected to density gradation processing and thereby converted to data per printing dot. The converted data is stored via an image data input-output control unit 10 in image memories 9Y, 9M, 9C and 9Bk (collectively designated by the reference numeral 9) which are adapted to store the items of color data DY, DM, DC, DBk, respectively, as separated for the four colors. The data is also read out of the memories 9 via the unit 10. The memories are provided by dynamic RAM (DRAM).

The data stored in the image memory means 9 is delivered therefrom to color image forming means 11, such as a color ink jet printer, transfer-type heat-sensitive printer employing color ribbons or electrostatic printer employing toners, from item to item to print out images of yellow, magenta, cyan and black as superposed one over another. Accordingly, in synchronism with the printing operation of the device 11 for forming the images of different colors, the image data is read out via the image data input-output unit 10 from the respective memory areas 9Y, 9M, 9C, 9Bk of the image memory device 9 successively.

The arrangement including the color image input unit 4 through the image forming device 11 constitutes a color signal processing assembly 12, for which various copying conditions such as those used for conventional copying apparatus are entered through a key input unit 14. Examples of conditions to be specified are "image superimposition mode" for superimposing a binary (monochrome) image on a full-color (polychrome) image, the "color" of such a binary image, the "number of original sheets" and "copy start" instruction, as will be described later. Signal control required for the manipulation of keys on the key input unit is effected by a signal control unit 15. A timing control unit 16 including, for example, a quartz oscillator, is provided for synchronizing the operation of various components of the signal processing assembly 12.

Figure 3:
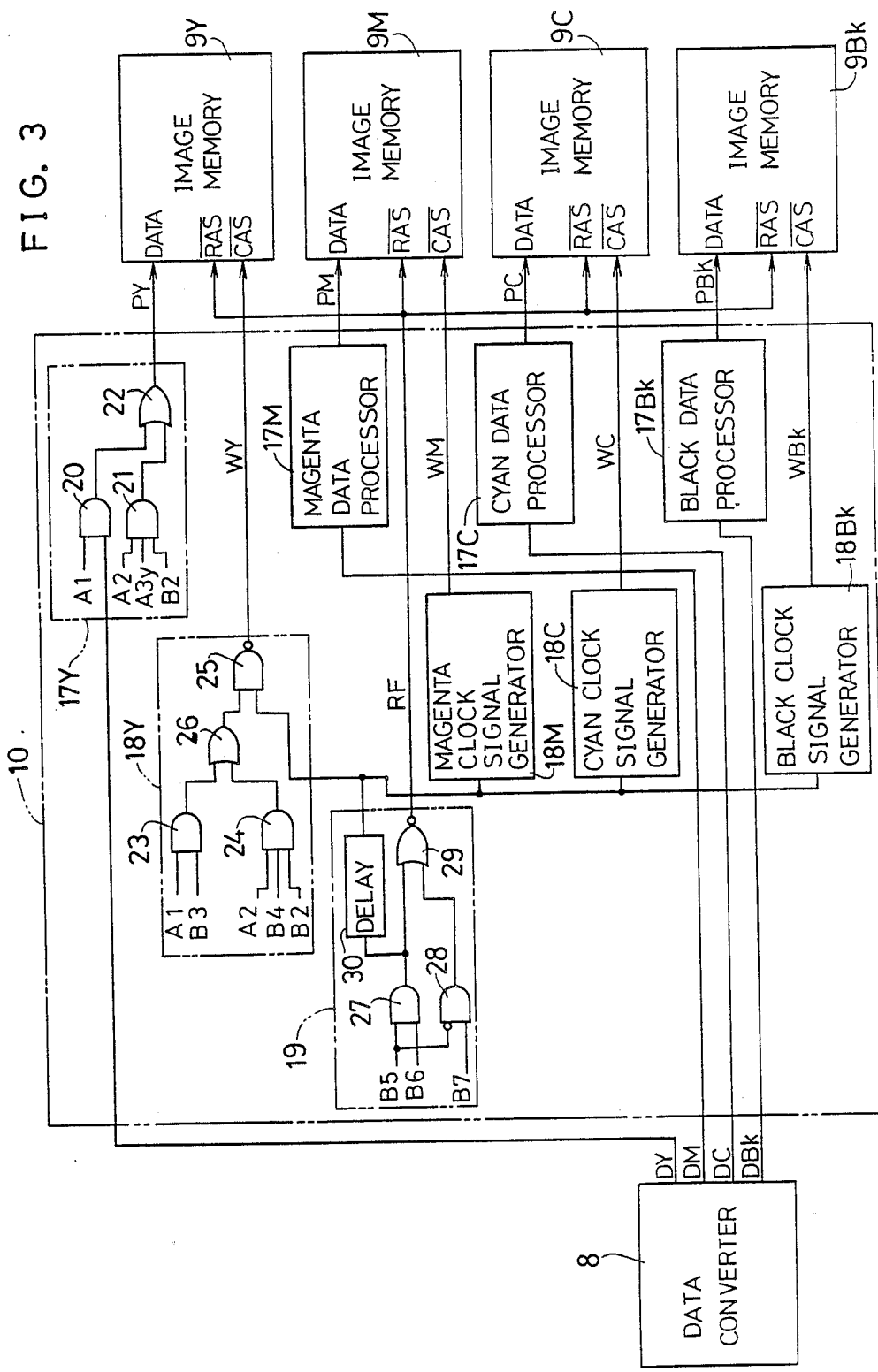
FIG. 3 is a fragmentary block diagram showing the circuit of FIG. 2 in greater detail.

FIG. 3 is a block diagram showing the main components of the image data input-output control unit 10 of FIG. 2. The construction of the control unit 10 will be described with reference to FIGS. 2 and 3.

The image data input-output control unit 10 includes color data processors 17Y, 17M, 17C and 17Bk for entering into the image memories 9Y, 9M, 9C and 9Bk signals PY, PM, PC and PBk obtained by processing the color data DY, DM, DC and DBk, respectively; color input clock signal generators 18Y, 18M, 18C and 18Bk for feeding to $\overline{CAS}$ input terminals of the image memories 9Y, 9M, 9C and 9Bk color input clock signals WY, WM, WC and WBk obtained by processing image data input timing signals in a full-color image mode and binary image mode; and a signal converter 19 for feeding as an $\overline{RAS}$ signal, a signal RF composed of an image input clock signal and a refresh clock signal to $\overline{RAS}$ input terminals of the image memory device 9.

The color data processor 17Y, like the other color data processors 17M, 17C and 17Bk, comprises AND circuits 20, 21 and an OR circuit 22.

A full-color image mode signal A1 and the yellow data DY are fed to the AND circuit 20, and a binary image mode signal A2, yellow specifying signal A3y and binary image data B2 to the AND circuit 21. The outputs of these AND circuits 20, 21 are delivered to the OR circuit 22, the output PY of which is given to a data input terminal of the image memory 9Y.

The color input clock signal generator 18Y, like the other input clock signal generators 18M, 18C and 18Bk, comprises AND circuits 23, 24 a NAND circuit 25 and an OR circuit 26.

The full-color image mode signal A1 and a full-color image data input timing signal B3 are fed to the AND circuit 23, and the binary image mode signal A2, a binary image data input timing signal B4 and the binary image data B2 to the AND circuit 24. The outputs of these AND circuits 23, 24 are fed to the OR circuit 26, which in turn delivers an output to the NAND circuit 25.

The signal converter 19 comprises AND circuits 27, 28, a NOR circuit 29 and a delay circuit 30.

An image data input timing signal B5 and image data input clock signal B6 are fed to the AND circuit 27. Further, the image data input timing signal B5 is inverted and a refresh clock signal B7 to the AND circuit 28. The outputs of the AND circuits 27, 28 are applied to the NOR circuit 29, the output RF of which is delivered to the $\overline{RAS}$ input terminals of the image memories 9Y, 9M, 9C and 9Bk.

On the other hand, the output of the AND circuit 27 is delayed in the delay circuit 30, for example, by 60 ns and then fed to the NAND circuit 25. The output WY then is delivered to the $\overline{CAS}$ input terminal of the image memory 9Y as an input clock signal. The magenta, cyan and black clock signal generators 18M, 18C and 18Bk are also similarly constructed for feeding the input clock signals WM, WC and WBk to the image memories 9M, 9C and 9Bk, respectively.

Figure 4:
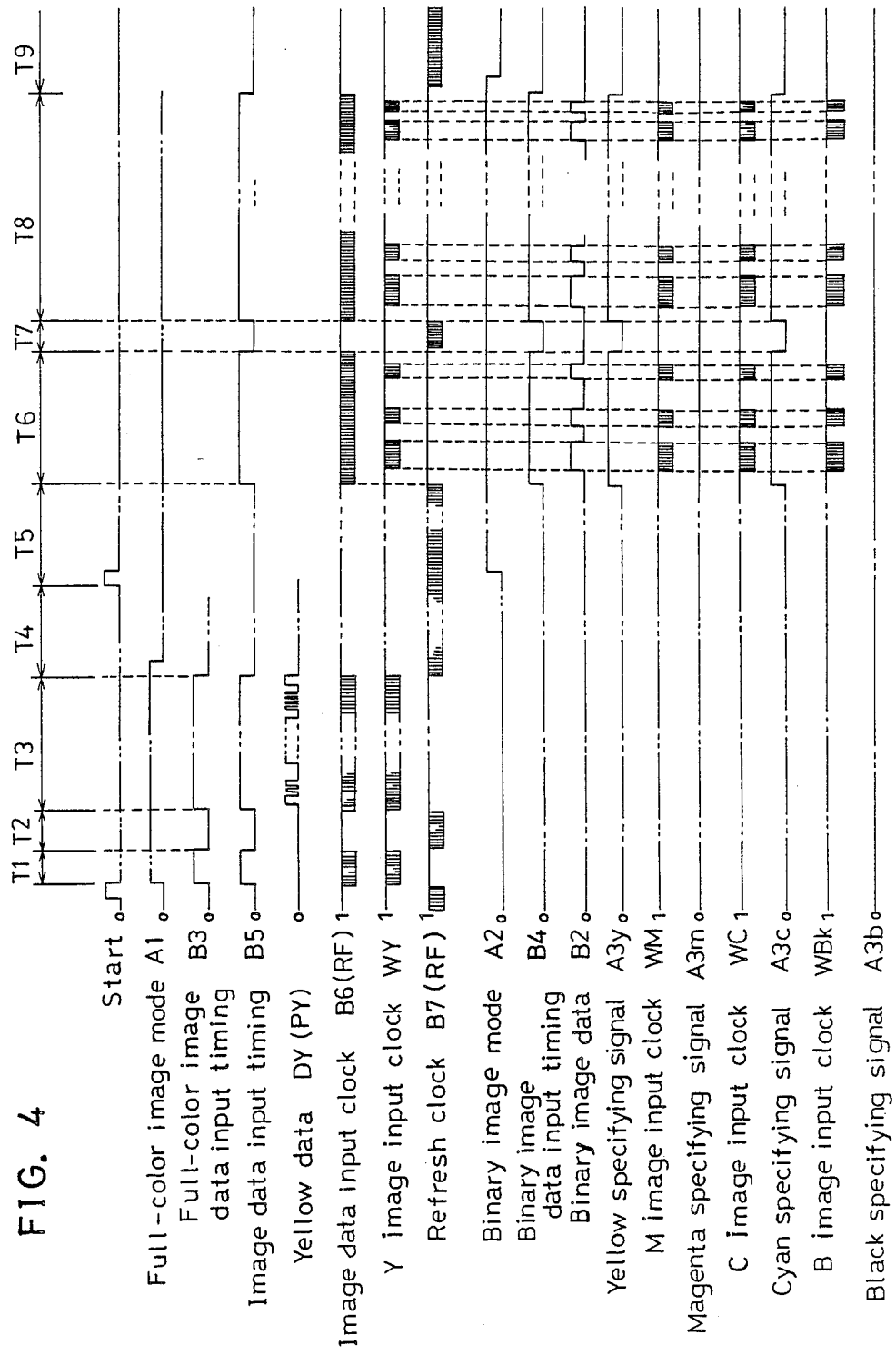
FIG. 4 is a timing chart for illustrating the operation of the color copying apparatus of FIG. 1.

FIG. 4 is a timing chart for illustrating the operation of the image data input-output control unit 10. With reference to FIGS. 1 to 4, the operation of the color copying apparatus embodying the invention will be described.

First, the key input unit 14 (FIG. 2) is used for specifying the "image superimposition mode" and also for specifying the color of the binary image to be formed as "green (combination of yellow and cyan)" and the "number of original sheets" of binary image as "1". Next, with a full-color image original placed on the table 1 (FIG. 1), the instruction "copy start" is given through the key input unit 14, whereupon full-color image mode signal A1 changes to "1". In period T1, signals DY, DM, DC DBk are all set to "0", and input clock signals WY, WM, WC and WBk are fed to the image memory device 9, so that the data in the image memory device 9 is entirely cleared.

Subsequently during period T2, a refresh clock signal only is fed to the image memory device 9 with signal RF. During this period, white balance adjustment or a similar adjustment is made by the input data processor 6 (FIG. 2).

Next in period T3, a full-color image mode is executed, in which with the movement of the table 1, the color image data on the original on the table 1 is read from line to line through the color image input unit 4 and converted to color signals DY, DM, DC and DBk. Those signals are then processed into signals PY, PM, PC and PBk. These signals are stored in the image memory device 9. (FIG. 4 shows only the signals relating to the image memory 9Y.) When the color image data on the original sheet (one page) has been completely read, the copying apparatus is temporarily held out of operation for a change of the original.

In period T4, the full-color image original is replaced by a binary image original. When the instruction "copy start" is given again, the binary image mode signal A2 is set to "1" to execute a binary image mode. With the present embodiment, the color for the binary image mode is specified as "green", so that the yellow specifying signal A3y and cyan specifying signal A3c are set to "1", and the magenta specifying signal A3m and the black specifying signal A3b is set to "0". Input clock signals WY, WM, WC and WBk are given in synchronism with binary image data B2. Consequently, the data written in the addresses corresponding to the input clock signals WY and WC in the image memories 9Y and 9C is changed to "1", while the data written in the addresses corresponding to the input clock signals WM and WBk in the image memories 9M and 9Bk is changed to "0". In this way, image data is read from one line of the binary image original. After the subsequent preparatory period T7 for the next line, the above operation is repeated during period T8. When the binary image data on the original sheet has been completely read from all the lines thereof, the image data stored in the image memory device 9 for the superimposition (combination) of full-color image and binary image is delivered from the respective color memories to the image forming device 11 by the input-output control unit 10. The image data delivered from the image memory 9Y for the entire original sheet is first printed out on a sheet of paper in yellow by the image forming device 11. Next, the image data for the original sheet as delivered from the memories 9M, 9C and 9Bk is printed out on the same paper sheet in magenta, cyan and black, respectively, in superimposed relation. Thus, an image is composed by superimposing a binary image of the specified color onto a full-color image.

Although a single binary image original is used in the above embodiment for superposing a green image thereof on the full-color image, two sheets of different binary image originals may be used with different colors specified for the originals. In this case, two kinds of binary images can be easily superposed in different colors on the full-color image merely by repeating the binary image reading procedure of the foregoing embodiment. Further the images of the larger number of binary image originals can be similarly superimposed all on the full-color image. In any of these cases, the full-color image data and the image data to be superimposed can be stored in the image memory device 9 at the same time. This eliminates the need to use memory device of increased capacity or additional memories for the images to be superimposed.

What is claimed is:

1. An image data composing system for superimposing a polychrome original image and a monochrome original image, to form a combined image comprising:
   reading means for reading image data from said polychrome image original image;
   means for separating said image data, obtained by the reading means, into a plurality of items of primary color image data;
   input means for entering the separated items of primary color image data, from said means for separating, into separate memory means for storage therein;
   said reading means, reading monochrome image data from a monochrome image original comprising first and second level value data;
   means for selecting at least one of said separate memory means for storage of said monochrome image data, obtained by said reading means;
   said input means, responsive to said selecting means, entering the monochrome image data into said selected memory means and writing the first level value in said selected memory means corresponding to said first level value data read by said reading means;
   said input means entering the monochrome image data into the remaining memory means and writing the second level value at addresses corresponding to the first level value data read by said reading means; and
   output means, responsive to said separate memory means, for delivering combined image data from the memory means, representing image data from both the monochrome original image and the polychrome original image, to output and thereby form said combined image.

2. A system as defined in claim 1 wherein the polychrome image original is a colored picture original, and the monochrome image original is a character original.

3. A system as defined in claim 1 wherein an original is read which comprises a polychrome original sheet and a plurality of character original sheets; and
   monochrome image data is read from each of the character original sheets and entered in each of a previously specified memory means subsequent to the image data of the polychrome original sheet being separated and stored in the separate memory means, the data written at addresses corresponding to the first level value data of said read monochrome image data, being changed to said first level value and the monochrome image data written at addresses corresponding to the first level value data of said read monochrome image data being changed to said second level value.

4. A system as defined in claim 1 wherein the first level value is a logical value of 1, and the second level value is a logical value of 0.

5. A system as defined in claim 1 wherein the primary color image data are yellow, magenta, cyan and black.

6. A system as defined in claim 1 wherein the separate memory means comprise dynamic memory.

7. An image data composing process for combining data of a monochrome original and a polychrome original, comprising the steps of:
   (a) separating image data, obtained from said polychrome original, into a plurality of items of primary color image data;
   (b) storing each of the separated items of primary color image data in a separate one of a plurality of separate memory means;
   (c) converting image data obtained from said monochrome original into monochrome image data comprising first and second level value data;
   (d) entering said monochrome image data into at least a specified one of said plural separate memory means and writing said first level value at addresses corresponding to the first level value data of said monochrome original;
   (e) entering the monochrome image data into the remaining plural separate memory means and writing said second level value at addresses corresponding to the first level value data of said monochrome original; and
   (f) delivering the image data from the plural separate memory means to form a combined image from said monochrome original and said polychrome original.

8. A process as defined in claim 7, wherein the polychrome image original is a colored picture original, and the monochrome image original is a character original.

9. A process as defined in claim 7 wherein an original is read which comprises a polychrome original sheet and a plurality of character original sheets; and
   monochrome image data is read from each of the character original sheets and entered in each of a previously specified of the plurality of separate memory means subsequent to the image data of the polychrome original sheet being separated and stored in the separate memory means, the monochrome data written at addresses corresponding to the first level value and the monochrome image data being entered in the remaining memory means, the monochrome data written at addresses corresponding to the first level value data of said read monochrome image data, being changed to said second level value.

10. A process as defined in claim 7 wherein the first level value is a logical value of 1, and the second level value is a logical value of 0.

11. A process as defined in claim 7 wherein the primary color image data are yellow, magenta, cyan and black.

12. A process as defined in claim 7 wherein the memory means comprise dynamic memory.

13. A system for storing a combined image composed of a polychrome original image and a monochrome original image, the system comprising:
  reading means for reading polychromatic image data from said polychrome original image;
  separating means, responsive to said reading means, for separating said polychromatic data into data corresponding to separate primary colors;
  plural memory means, responsive to said separating means, for separately storing said data, corresponding to each primary color;
  selecting means for selecting a color corresponding to at least one of said primary colors to represent monochromatic image data from said monochrome original image;
  said reading means reading monochromatic image data from said monochrome original image;
  designating means, responsive to said selecting means; for designating a first level value to at least one of said plural memory means, corresponding to said selected color, and a second level value to said remaining plural memory means;
  plural input means, equal in number and corresponding to said plural memory means, responsive to said reading means and said designating means, for receiving said monochromatic image data in each of said plural input means, from said reading means, and for only inputting said monochromatic image data into said plural memory means which have been designated by said first level value;
  said plural memory means, designated by a first level value, thereby storing said monochromatic image data from said monochrome original image in combination with said separately stored data corresponding to each primary color from said polychrome original image.

14. A system, as claimed in claim 13, wherein said data corresponding to separate primary colors corresponds to yellow, magenta, cyan, and black data.

15. A system, as claimed in claim 14, wherein said plural memory means comprises a separate memory means for separately storing said yellow, magenta, cyan, and black data.

16. A system, as claimed in claim 15, wherein said selecting means selects a color corresponding to at least one of yellow, magenta, cyan, and black.

17. A system, as claimed in claim 16, wherein said designating means designates a first value of a logical "1" to at least one of said plural memory means corresponding to said selected color, and a second value of a logical "0" to said remaining plural memory means.

18. A system, as claimed in claim 13, further comprising:
  output means, operatively connected to said memory means, for outputting said polychromatic data and said monochromatic image data stored in said plural memory means to thereby form said combined image.

19. A system, as claimed in claim 18, wherein said output means is a color ink jet printer.

20. A system, as claimed in claim 13, wherein said selecting means can be used to select a different color to represent said monochromatic image data, thereby altering which of said plural memory means will store said monochromatic image data.

21. A system, as claimed in claim 18, wherein said selecting means can be used to select a different color to represent said monochromatic image data, thereby altering said output combined image.

22. A system, as claimed in claim 15, further comprising:
  output means, operatively connected to said memory means, for outputting data from each of said plural memory means to thereby form a combined image of said polychrome original image and said monochrome original image.

23. A system, as claimed in claim 22, wherein said output means outputs data from said plural memory means in a prioritized order.

24. A system, as claimed in claim 23, wherein said prioritized order comprises said output means outputting data sequentially from said memory means storing yellow, magenta, cyan, and black data respectively.

25. A method of creating a combined image of a polychrome original image and a monochrome original image, comprising the steps of:
  (a) inputting polychromatic image data from said polychrome original image;
  (b) separating said polychromatic image data into data corresponding to separate primary colors;
  (c) storing said data corresponding to each of said primary colors, in a separate memory means;
  (d) selecting a color, corresponding to at least one of said primary colors, to represent monochromatic data from said monochrome original image;
  (e) inputting said monochromatic image data;
  (f) designating at least one of said separate memory means, corresponding to said selected color, to store said monochromatic image data;
  (g) storing said monochromatic data in said designated memory means in combination with said polychromatic image data previously separated and stored;
  (h) outputting data stored in said separate memory means to form said combined image.

26. A method, as claimed in claim 25, wherein said separate primary colors correspond to yellow, magenta, cyan, and black.

27. A method, as claimed in claim 26, wherein said step of outputting data from said separate memory means is performed in a prioritized order, said yellow data being output first and said magenta, cyan, and black data respectively superimposed thereon.

28. A method, as claimed in claim 25, further comprising the step of:
  (i) selecting a different color, corresponding to at least one of said primary colors, to represent said monochromatic data, thereby changing said output combined image.

* * * * *